US Patent 3,650,970 — Patented Mar. 21, 1972

3,650,970
CALCIUM SULPHATE SCALE INHIBITING COMPOSITION OF SALT OF ESTER POLYMER OF STYRENE-MALEIC ANHYDRIDE COPOLYMER

Richard J. Pratt, Flossmoor, and David W. Young, Homewood, Ill., assignors to Atlantic Richfield Company
No Drawing. Filed Jan. 8, 1969, Ser. No. 789,923
Int. Cl. C02b 5/06
U.S. Cl. 252—181      5 Claims

ABSTRACT OF THE DISCLOSURE

A method is disclosed for inhibiting calcium sulphate scale formations in systems containing water which contains calcium sulphate. The method comprises providing small amounts of a gypsum scale inhibitor which is an alkali metal or ammonium salt of an ester polymer formed by esterifying styrene-maleic anhydride copolymers with capped polyethylene glycols. The amount of the inhibitor provided can vary with the amount of calcium sulphate in the water but even very small amounts of the inhibitor reduce scale formations. The ester polymer salt can be formed in situ.

---

Scale may be defined as any deposit formed in place on solid surfaces in contact with water. As is well known, scale deposits are troublesome and can cause increased costs and efficiency loss in aqueous transfer system. In particular, calcium sulphate (gypsum) scale has created problems with water contact surfaces. Among the problems caused by scale deposits are obstruction of fluid flow, impedance of heat transfer, wear of metal parts, shortening of equipment life, localization of corrosion attack, poor corrosion inhibitor performance and unexpected equipment shutdown. These problems can arise in any water-contacting surface and in particular, wells, e.g., water or oil wells, water pipes and steam power plants.

Many attempts have been made to conquer scale formation and its resultant disadvantages. One of these has been the removal of the pipes themselves and cleaning out the deposits that have been formed. This procedure is costly, causes long shutdown periods, and does not prevent scale redeposition. Thus, scale will reform on the interior surfaces of the pipes after they have been placed back into use. Another method involves the pumping of hydrochloric acid along with a corrosion inhibitor into an oil or water well but this treatment is not effective because the acid has no effect on sulphate scale. While the acid does dissolve carbonate scale present, the acid can deleteriously affect various other parts of the metallic equipment. Attempts have been made to combat scale using an additive in the water, but these additive treatments have not proved completely effective because they usually do not remove existing scale but instead only inhibit the growth of scale in piping and other surfaces. Also, additive-treatment generally requires large amounts of additives and periodic retreatments of the water. Of recent interest have been the slow-release additive systems in which glass-like polyphosphate salts or pelletized carboxymethyl cellulose mixed salts are used. However, the former inhibitor is not very effective because the dissolving polyphosphates revert rapidly to inactive orthophosphates while the latter salts require a relatively high dosage and have a relatively short period of effectiveness.

This invention has as one of its objects the addition to a calcium sulphate-containing water system of an inhibitor which is effective in small quantities and does not rapidly revert to an inactive form. Another object of the present invention is the addition to a calcium sulphate-containing water system of an inhibitor that is easily prepared and can be a liquid without dusting problems. The novel scale inhibitors of the present invention are alkali metal and ammonium salts of ester polymers formed from partial esterification of copolymers of styrene with maleic anhydride with a capped polyethylene glycol. These ester polymer salts are used in calcium-sulphate containing waters in a small amount sufficient to successfully inhibit the formation of solid scale on the water-contacted solid surfaces, e.g. iron and steel. The unneutralized esters which are a component of this invention are non-toxic as to handling and skin contact and are water-soluble. The unneutralized esters are useful in "neat" form in highly alkaline, gypsum-forming waters where they may be neutralized in situ generating inhibition in a controlled self-contained rate. The neutralization in situ feature of this invention provides a novel "slow release" for the inhibitor. The inhibitors of the present invention can be analyzed in very low concentrations, are easily solubilized in water and prevent coagulation of inhibited scale particles which are in solution.

The styrene-maleic anhydride copolymers, the partial esters of which are employed in the novel inhibitors of this invention, are preferably resinous copolymers of styrene and maleic anhydride having about 1 to 4 moles of styrene per mole of maleic anhydride, preferably about 1 to 3 moles of styrene per mole of maleic anhydride. The molecular weights of the unesterified copolymers are generally at least about 400 up to about 10,000 but can be of higher molecular weights as long as the esters thereof and the capped polyethylene glycols are water-soluble. A ten weight percent solution in acetone of the unesterified copolymer of styrene and maleic anhydride generally exhibits a viscosity at 30° C. of about 0.5 to 3 centistokes, with viscosities in the range of about 0.52 to 1 cs. often being preferred. Melting points of the unesterified copolymers are generally in the range from about 80–200° C. as determined by the Fischer-Johns Melting Point Apparatus.

The styrene-maleic anhydride copolymers can be prepared by known methods of the art. The preferred method is by solution polymerization wherein monomers are polymerized in a suitable solvent employing as a polymerization catalyst, a free radical peroxide catalyst, preferably benzoyl peroxide or dicumyl peroxide, at a temperature of about 75 to 300° C., or more. Suitable solvents include the aromatic hydrocarbon solvents such as cumene, p-cymene, xylene, toluene, etc. The aromatic solvents may be chain-terminating solvents and may be used to give lower molecular weight products. Other suitable solvents are the ketones, such as methylethylketone. The preferred method of carrying out the polymerization is by what can be called incremental feed addition. By this method the monomers and catalysts are first dissolved in a portion of the solvent in which the polymerization is to be conducted and the resulting solution fed in increments into a reactor containing solvent heated to reaction temperature, usually the reflux temperature of the mixture. When an aromatic solvent is employed as the solvent for the polymerization the formation of the copolymer causes a heterogeneous system, the polymer layer being the heavier layer and recoverable by merely decanting the upper aromatic solvent layer and drying the residue. On the other hand, when a ketone is the solvent, the formed copolymer is usually soluble in the solvent media so that recovery of the product may involve a solvent stripping operation.

The alcohol employed in the esterification of the styrene-maleic anhydride copolymer is a capped polyethylene glycol corresponding to the following general formula:

$$HO[CH_2CH_2O]_xR$$

wherein R is a lower alkyl radical, e.g. containing up to about 4 carbon atoms, and $x$ varies from about 3 to 120. The methoxycapped polyethylene glycol esters are preferred. These glycols are in the approximate 100 to 5,000 molecular weight range with a molecular weight range of about 300 to 1000 being preferred.

The extent of half-esterification of the styrene-maleic anhydride copolymers will be sufficient to make them water-soluble. The extent of half-esterification will thus generally be about 10 to 100%, preferably about 20 to 80%, i.e., about 5 to 50%, preferably about 10 to 40%, of the total number of anhydride groups of the copolymer are esterified with the alcohol. The esterification can be effected by simply heating a mixture of the appropriate quantities of styrene-maleic anhydride copolymer and alcohol at elevated temperatures, usually about 100 to 200° C., often about 170–180° C., say for about 3 to 4 hours. The salts can be prepared by reacting the glycolesterified, styrene-maleic anhydride copolymers with the requisite alkali metal or ammonium hydroxide to give the ester polymer salt or organic poly-electrolyte. The salts can also be prepared in situ in aqueous medium by the addition of the requisite components. In many of the water-containing systems where the inhibitors of this invention would prove useful, the water is highly alkaline and only the ester polymer need be added in order to form the salt which inhibits the gypsum scale. If the water system does not contain sufficient alkali metal or ammonium ion content (as may be determined by simple qualitative and quantitative analysis) then a sufficient amount of this reactant can be added.

The amount of inhibitor added or formed in situ in the calcium-sulphate containing water system is a small amount sufficient to inhibit the formation of solid deposits of calcium sulphate scale on the water surfaces. This amount can be as low as about 1 part per million with at least 2 parts per million being preferred, and may be as high as 200 p.p.m. or more. In the most preferred embodiment, there is present in the water at least about 20 p.p.m. of the ester polymer salt inhibitor of this invention. The minimum amount needed in the water varies depending on the amount of calcium sulphate present in the water. Usually calcium sulphate will be present in an amount from about 2,000 p.p.m. up to about 20,000 p.p.m. or more. Below about 2,000 p.p.m., the insoluble calcium sulphate may not build up scale deposits at a rate fast enough to present serious problems although the deposits will build up over a longer period of time. In most of the water systems under consideration, the calcium sulphate content will often vary between about 2,000 and 15,000 p.p.m. As set forth above, the amount of inhibitor provided can vary with the calcium sulphate content. Generally, the greater the amount of calcium sulphate present, the larger the amount of the inhibitor which must be provided for complete inhibition although even a relatively small amount of inhibitor will provide some inhibition in a water system containing a relatively large amount of calcium sulphate in the water. Thus, the use of any of the inhibitors of the present invention in even a small amount will provide less scale deposits in a calcium-sulphate-containing water system.

A sodium polymer salt of the type described above was tested in conjunction with saturated water solutions of $CaSO_4$ to which excess sulphate had been added. The ester polymer was produced from the reaction of 6,830 grams of a 1:1 copolymer of styrene and maleic anhydride of a molecular weight of about 1600 with 8.165 grams of a methoxy-terminated polyethylene oxide type polymer of a molecular weight of about 350 ("Carbowax 350") at about 170° C. for about 4 hours. This ester polymer was reacted with sodium hydroxide to give a 2% solution in water of the sodium polymer ester salt. This material was a clear, very light yellow viscous liquid with good solubility in water. A few drops of the sodium salt were added to the sulphate solutions in the amounts of from about 0.25 to 2.5 milliliters of the sodium salt per 5 to 15 milliliters of the saturated calcium sulphate solutions. It was found that the polymer salt would solvate, react with the insolubles and give a clear, water white, transparent solution in a short period of time. The corresponding ammonium and potassium salts of the ester polymer also gave the same results.

The present invention will be further illustrated by the following examples.

EXAMPLE I

Test solutions were prepared from stock solutions of sodium chloride and calcium chloride to provide about 100,000 ppm. of chloride ion and enough calcium ion to generate 10,200 ppm. of $CaSO_4$. The inhibitors were prepared by first heating a 1:1 copolymer of styrene and maleic anhydride of a molecular weight of about 1600 with methoxy-terminated polyethylene glycols of varying molecular weights at 170 to 175° C. for 3 to 4 hours. The polyethylene glycols used had the following molecular weights: 350, 550, 750, 2,000 and 5,000. To help remove water and odor products, nitrogen was slowly passed through the hot mixture of copolymer and glycol throughout the heating period. The ester polymer formed was of low viscosity and easy to remove from the reactor. After cooling overnight, the ester polymers were reacted at room temperature with aqueous sodium hydroxide to give a 2% solution of the ester polymer salt. These salts were added to the test solutions as described above, solid sodium sulphate was dissolved and the resulting mixture allowed to stand for 24 hours at room temperature. The weight of dried calcium sulphate dihydrate crystals deposited in the solution determined the inhibitor performance. All of the glycols tested demonstrated inhibiting ability although the higher molecular weights glycols (i.e., 2,000 and 5,000 molecular weight) were not as effective as the lower molecular glycols (i.e., 350, 550, and 750 molecular weight). However, these higher weight glycols esterified with great difficulty and the lower inhibiting power of their salts may have been due to this poor esterification.

EXAMPLE II

Samples were made and tested to determine the effect, if any, of the acid number of the copolymer on the inhibition activity of the ester polymer salt. The test solutions were prepared as in Example I. The inhibitor samples were made by the procedure as outlined in Example I, above. The only difference in the samples was the acid number of the base resin. The glycol used in each case was a methoxy-terminated polyoxyethylene glycol of a molecular weight of about 550. The testing procedure was the same as used in Example I. The results are shown below in Table I:

TABLE I

| Acid number before esterification | Calcium sulphate weight (mg.) after 24 hours | Percent inhibition |
|---|---|---|
| 497 | 8–21 | 96–98 |
| 456 | 10 | +98 |
| 426 | 312 | 45 |
| Blank | 568 | 0 |

The break between 456 and 426 acid numbers shows that high acid numbers are advantageous, especially since under certain conditions of intended use, as in an oil well, the ester can be hydrolyzed consequently decreasing the glycol content of the ester. However, the data also shows that base resins of acid numbers less than 450 are still effective inhibitors.

EXAMPLE III

A partial ester of a 1:1 styrene-maleic anhydride copolymer of an average unesterified molecular weight of about 1600 and methoxy-terminated polyoxyethylene glycol of a molecular weight of about 550 was made using the procedure outlined in Example I, above, A 10% solution of the sodium salt of the ester polymer was prepared by adding a 16% NaOH (10% on Na) solution to 10 grams of the ester polymer and 90 grams of water until the clear solution reaches a pH of about 7.5 to 8.5. A 0.01 ml. aliquot of this solution is equivalent to 10 ppm. inhibitor. To a tared 100 ml. capacity centrifuge tube, 49.2 ml. of 160,000 p.p.m. of chloride ion (from sodium chloride) and 39.4 ml. of 7,440 p.p.m. calcium ion (from calcium chloride) were metered from separate burrettes. The inhibitor was added in the amount of 0.02 ml. Calcium sulphate then formed in situ by dissolving 1.06 grams of anhydrous sodium sulphate in this solution. After 24 hours at room temperature (which fluctuated considerably) the supernate was decanted, the crystals rinsed with two separate 25 ml. portions of distilled water and two 15 ml. portions of drum grade acetone. The tube and sample were dried a minimum of two hours at 90–100° C. in a vacuum oven, cooled slightly and weighed. The weight difference afforded weight of calcium sulphate dihydrate. Theoretically, only 300 to 350 milligrams were expected from uninhibited solutions but the actual results ran as high as 600 milligrams.

EXAMPLE IV

The amount of inhibitor required to reduce or prevent calcium sulphate scale deposits is dependent on the quantity of ions capable of forming this scale that are contained in the water system. Waters containing varying amounts of calcium sulphate were tested with different amounts of the sodium ester polymer salt of Example I that had been esterified with the methoxy-terminated polyoxyethylene glycol of a molecular weight of about 550. The results are shown in the following table:

TABLE II

| P.p.m. of calcium sulphate in water | P.p.m. inhibitor added | Result |
|---|---|---|
| Up to 10,000 | 2-3 | Scaling reduced. |
|  | 20 | Scale completely prevented. |
| 13,000 | 20 | Scaling reduced. |
| 13,000 | +100-200 | Scale completely prevented. |

It is thus apparent that the inhibitor level should be raised correspondingly with increasing calcium sulphate content but that even a relatively small amount of the inhibitor of the present invention reduces the gypsum scale formation that would occur if the inhibitor were not provided in the water.

We claim:
1. Calcium sulphate scale inhibited water which comprises water containing calcium sulphate and a small amount of a scale inhibitor effective to reduce calcium sulphate scale formation caused by contact of the water with solid surfaces, said scale inhibitor being an alkali metal or ammonium salt of a water-soluble ester polymer of a copolymer of styrene and maleic anhydride, the molar ratio of the sytrene to maleic anhydride in the copolymer being from about 1:1 to about 4:1, and the copolymer having an unesterified molecular weight of from about 400 to 10,000, and wherein an alcohol corresponding to the general formula:

$$R(OCH_2CH_2)_xOH$$

wherein R is a lower alkyl radical and $x$ varies from about 3 to about 120 is used as the esterifying agent for said copolymer.

2. The water of claim 1 wherein the esterifying alcohol is a methoxy-terminated polyoxyethylene glycol having a molecular weight of about 300 to 1000.

3. The water of claim 1 wherein the said ester polymer salt is provided in an amount sufficient to produce a concentration in the water of about 2 to 200 parts per million of the ester polymer salt.

4. The water of claim 2 wherein the water contains about 2000 to 15,000 parts per million of calcium sulphate.

5. The water of claim 4 wherein the esterifying alcohol is a methoxy-terminated polyoxyethylene glycol having a molecular weight of about 300 to 1000.

References Cited

UNITED STATES PATENTS

| 2,723,956 | 11/1955 | Johnson | 252—181 X |
| 2,933,468 | 4/1960 | Aldridge | 260—29.6 X |
| 3,085,986 | 4/1963 | Muskat | 260—31.8 |
| 3,236,797 | 2/1966 | Williams | 260—29.6 |

JOHN T. GOOLKASIAN, Primary Examiner

M. E. McCAMISH, Assistant Examiner

U.S. Cl. X.R.

21—2.7; 134—2; 210—58, 59; 252—8.55 B, 180; 260—29.6 E, 78.5 R